US008676165B2

(12) United States Patent
Cheng et al.

(10) Patent No.: US 8,676,165 B2
(45) Date of Patent: Mar. 18, 2014

(54) METHOD AND APPARATUS FOR PEER-TO-PEER INSTANT MESSAGING (75) Inventors: Jiang Cheng, Shanghai (CN); Fan Wu, Shanghai (CN)

(73) Assignee: ST-Ericsson SA, Plan-les-Ouates (CH)

( * ) Notice: Subject to any disclaimer, the term of this patent is extended or adjusted under 35 U.S.C. 154(b) by 1314 days.

(21) Appl. No.: 11/722,978

(22) PCT Filed: Dec. 15, 2005

(86) PCT No.: PCT/IB2005/054254
§ 371 (c)(1),
(2), (4) Date: Jun. 28, 2007

(87) PCT Pub. No.: WO2006/070300
PCT Pub. Date: Jul. 6, 2006

(65) Prior Publication Data
US 2007/0275696 A1 Nov. 29, 2007

(30) Foreign Application Priority Data

Dec. 28, 2004 (CN) .......................... 2004 1 0011522

(51) Int. Cl.
*H04W 4/12* (2009.01)
(52) U.S. Cl.
USPC ..................... 455/412.1; 455/412.2; 455/566
(58) Field of Classification Search
USPC ............. 455/412.1–2, 414.1–2, 414.4, 426.1, 455/466, 501.1, 566
See application file for complete search history.

(56) References Cited

U.S. PATENT DOCUMENTS

| 6,690,950 | B2 * | 2/2004 | Uranaka et al. ............... 455/558 |
| 6,990,353 | B2 * | 1/2006 | Florkey et al. ............... 455/519 |
| 6,993,327 | B2 * | 1/2006 | Mathis ....................... 455/414.1 |
| 7,129,455 | B2 * | 10/2006 | Webb et al. ................ 250/201.9 |
| 7,269,162 | B1 * | 9/2007 | Turner ........................... 370/352 |
| 7,412,231 | B1 * | 8/2008 | Kelleher .................... 455/412.1 |

(Continued)

FOREIGN PATENT DOCUMENTS

| JP | 2003-091494 | 3/2003 |
| JP | 2003-114858 | 4/2003 |
| WO | WO 03/049326 A1 | 6/2003 |

OTHER PUBLICATIONS

International Search Report dated Jun. 14, 2006 in connection with International Patent Application No. PCT/IB2005/054254.

(Continued)

*Primary Examiner* — Cong Tran
(74) *Attorney, Agent, or Firm* — Coats & Bennett, P.L.L.C.

(57) ABSTRACT

The invention proposes a method of peer-to-peer instant messaging and the mobile terminal thereof, which could make the mobile terminal to establish and maintain a list of friend users and update the connection status of the friend users timely. The method of peer-to-peer instant messaging includes following steps: receiving the list of on-line users with capability of peer-to-peer instant messaging sent by the radio network (S260); comparing said list of particular users with said received list of on-line users (S270); updating, according to said comparison result, the connection status record of each user in said list of particular users (S280) so that the mobile terminal could establish a peer-to-peer instant messaging with at least one user mobile terminal in said list of particular users according to said updated connection status record. The present invention enables the user to establish peer-to-peer connection more effectively and to perform instant messaging while occupying less network resources.

20 Claims, 5 Drawing Sheets

(56) References Cited

U.S. PATENT DOCUMENTS

| | | | |
|---|---|---|---|
| 7,668,515 B2 * | 2/2010 | Mayblum et al. | 455/90.2 |
| 8,200,755 B2 * | 6/2012 | Fujimoto et al. | 709/204 |
| 8,548,444 B2 * | 10/2013 | Channakeshava et al. | 455/414.1 |
| 2003/0083046 A1 * | 5/2003 | Mathis | 455/412 |
| 2003/0126213 A1 | 7/2003 | Betzler | |
| 2003/0182428 A1 | 9/2003 | Li et al. | |
| 2004/0117228 A1 * | 6/2004 | Iino et al. | 705/7 |
| 2004/0214571 A1 | 10/2004 | Hong | |
| 2004/0215735 A1 * | 10/2004 | Nakahara et al. | 709/207 |
| 2004/0248569 A1 | 12/2004 | Kondou et al. | |
| 2004/0249953 A1 | 12/2004 | Fernandez et al. | |
| 2006/0116139 A1 * | 6/2006 | Appelman | 455/466 |
| 2006/0136584 A1 * | 6/2006 | Decker et al. | 709/224 |
| 2006/0167991 A1 * | 7/2006 | Heikes et al. | 709/204 |
| 2007/0042815 A1 * | 2/2007 | Trap | 455/575.1 |
| 2013/0310007 A1 * | 11/2013 | Rangroo et al. | 455/412.1 |

OTHER PUBLICATIONS

Written Opinion of the International Searching Authority dated Jun. 14, 2006 in connection with International Patent Application No. PCT/IB2005/054254.

Saint-Andre, Peter "Jabber FAQ and User Guide" jabber.org Website, May 2001.

Anonymous: "AOL Instant Messenger, User'S Guide" AOL Website, Feb. 1998.

Banerjee, N; et al "Peer-To-Peer Instant Messaging and Presence Services Over Wireless Ad Hoc Networks" IBM Research Report, San Jose, CA, US, Aug. 6, 2004, pp. 1-7.

* cited by examiner

METHOD AND APPARATUS FOR PEER-TO-PEER INSTANT MESSAGING

FIELD OF THE INVENTION

The present invention relates to instant messaging (IM), and more particularly to a method and apparatus for peer-to-peer (P2P) instant messaging in the radio networks.

BACKGROUND OF THE INVENTION

Instant messaging systems are used for enabling users in the network to chat or transfer information in the manner of words or other information in real time, and the network could be the Internet or other mobile radio networks such as GSM, CDMA, etc. Meanwhile, the instant messaging system could timely inform each of the on-line users of the on-line/off-line status of the users in his contact list.

The conventional instant messaging systems use the Client/Server structural mode, while under said peer-to-peer communication mode, real time chatting or information transferring could be directly performed between two or more mobile terminals without the involvement of a base station. As for the establishing of peer-to-peer instant messaging between two mobile terminals, the US Patent Publication No. 2003/0182428A1 (whose inventors are Jiang Li, Keman Yu, Kaibo Wang, Yong Li and Shipeng Li) has disclosed a relevant method. According to said method, firstly, the client terminal is connected to the IM server; the client terminal sends its device address and access code to the IM server; the client terminal searches for other on-line client terminals in the IM server; the client terminal receives the information of other on-line client terminals transmitted from the IM server; the client terminal analyzes the information of other client terminals to determine if they are in the same network, if so, a peer-to-peer connection will be established; the client terminal transmits information to the opponent client terminal to start the peer-to-peer communication. By means of said method, peer-to-peer instant messaging could be established between two client terminals. Since the TD-SCDMA system under the TDD (Time Division Duplex) mode could perform uplink and downlink transmission on the same carrier without using the up and down symmetrical frequency spectrum as needed by the FDD (Frequency Division Duplex) system, it becomes the CDMA system suitable for peer-to-peer communication.

The problem of said prior art is that under the premise of peer-to-peer instant messaging, the user of a mobile terminal could only perform instant messaging with other mobile terminals that could establish peer-to-peer connection with it, meanwhile, the user of a mobile terminal usually performs on-line instant messaging only with some fixed particular users (such as friends or business partners, customers, etc.) instead of with all the users in the contact list. Therefore, the user needs to keep a list of these particular users in the mobile terminal. In addition, when the user wants to establish connection with these particular users, he needs to know if these users are on-line and meet the demand for establishing peer-to-peer connection, that is, the user needs the connection status information of these particular users that is updated timely. However, during the practical application of said prior art, said list of particular users and the connection status information are usually maintained and managed by the network, and this will occupy some network resources which are more precious than the mobile terminal resources; moreover, the network load will accordingly become too heavy.

Therefore, there exists a need to provide a method and apparatus for peer-to-peer instant messaging that could enable the user to use the network resources more effectively and occupy less network resources.

OBJECT AND SUMMARY OF THE INVENTION

An object of the present invention is to provide a method of peer-to-peer instant messaging in the radio networks, which could make the mobile terminal establish and store the list of particular users and could timely update the connection status information of these particular users.

Another object of the present invention is to provide a mobile terminal which could perform peer-to-peer instant messaging, make the mobile terminal establish and store the list of particular users and timely update the connection status information of these particular users, so that the mobile terminal could establish peer-to-peer instant messaging with these particular users according to the updated connection status information.

A method of peer-to-peer instant messaging used for a mobile terminal is provided according to the present invention, said mobile terminal comprising a pre-stored contact list which includes at least one list of particular users, said method comprising the following steps: receiving the list of on-line users that have the capability of peer-to-peer instant messaging which is sent by the radio network; comparing said list of particular users with said received list of on-line users; updating, according to said comparison result, the connection status record of each user in said list of particular users so that the mobile terminal could establish peer-to-peer instant messaging with at least one user mobile terminal in said list of particular users according to said updated connection status record.

A method of peer-to-peer instant messaging used for a mobile terminal is provided according to the present invention, said mobile terminal comprising a pre-stored contact list which includes at least a list of particular users, said method comprising the following steps: reporting to other mobile terminals capability of peer-to-peer instant messaging; receiving identification information feedback sent by said other mobile terminals respectively; comparing said list of particular users with the received said identification information feedback; updating, according to said comparison result, the connection status record of each user in said list of particular users, to make said mobile terminal to establish peer-to-peer instant messaging with at least one user mobile terminal in said list of particular users according to said updated connection status record.

A mobile terminal is provided according to the present invention which can perform peer-to-peer instant messaging, comprising: a receiving means for receiving a list of the on-line users that have capability of peer-to-peer instant messaging transmitted by the radio network; a user list recording means for storing a contact list which comprises at least one list of particular users; a status recording means for recording the connection status of each user in said list of particular users; and a controller for comparing said received list of on-line users with said list of particular users.

In summary, the present invention provides the method of peer-to-peer instant messaging and the mobile terminal, said mobile terminal comprising a user list recording means and a user status recording means which could store the list of particular users and the connection status thereof. When the user turns on the mobile terminal and registers with the radio network, the radio network will send the list of on-line mobile users to said mobile terminal, after comparison, the mobile terminal could obtain the on-line contact list, and the user could send a request for connection according to said list, so that he could establish a peer-to-peer connection more effectively and perform instant messaging while occupying less network resources.

Other objects and achievements together with a fuller understanding of the invention will become apparent and appreciated by referring to the following description and appended claims taken in conjunction with the accompanying drawings.

BRIEF DESCRIPTION OF THE DRAWINGS

In all the above-mentioned figures, having the same reference sign represents having the same, similar or corresponding feature/function.

DETAILED DESCRIPTION OF THE INVENTION

Figure 1:
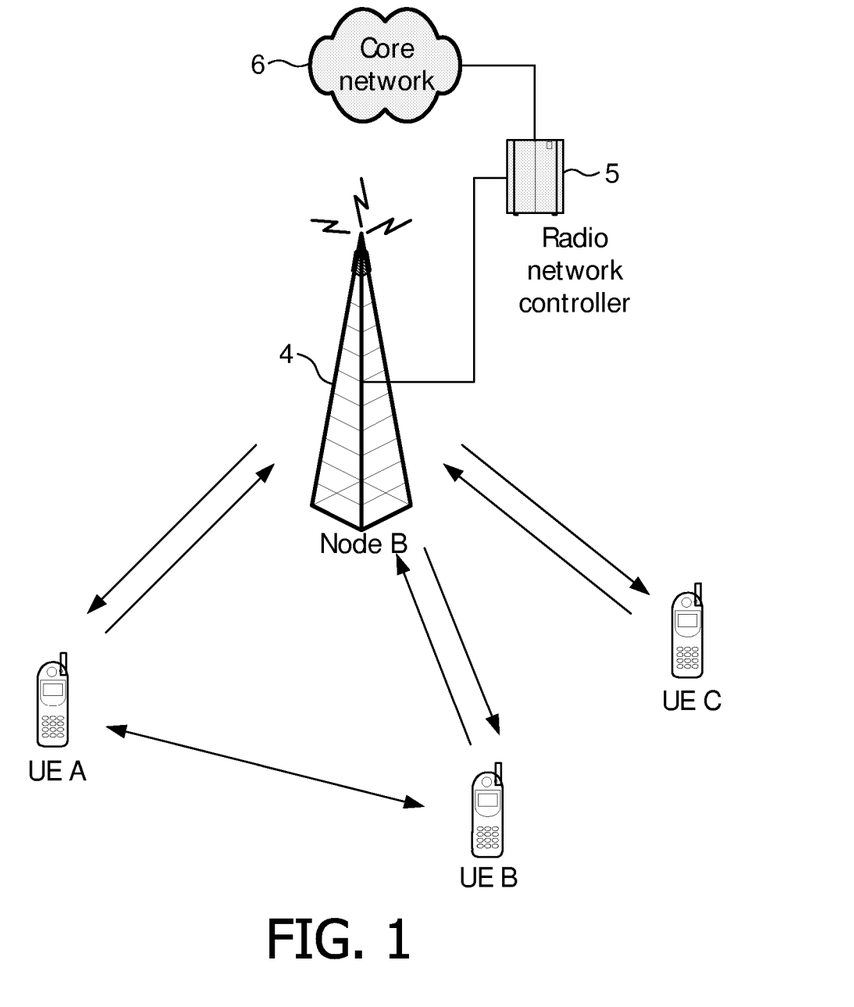
FIG. 1 is a schematic diagram of the application environment of the peer-to-peer instant messaging system according to one embodiment of the present invention.

FIG. 1 is a schematic diagram of the application environment of the peer-to-peer instant messaging system according to one embodiment of the present invention. Mobile terminals UE A, UE B and UE C could be wirelessly connected to the base station or to the node B, the node B is connected to the core network 6 via the radio network controller (RNC) 5, and the user terminals UE A, UE B and UE C exchange information through the UMTS terrestrial radio access network (UTRAN) formed by the base station transceiver (node B) and the radio network controller 5.

If the user terminal UE A wants to establish peer-to-peer communication with the user terminal UE B, the calling user terminal UE A that requests the peer-to-peer communication first sends a peer-to-peer calling request to the UTRAN through the uplink control channel, and in the invention of the application number 03119895.3 titled "Method and apparatus for establishing and maintaining radio link of peer-to-peer communication in radio communication network" which was filed with the Chinese Patent Office by Koninklijke Philips Electronics N. V. on Mar. 7, 2003, a method of establishing and maintaining a peer-to-peer communication radio link is described in detail, and the disclosure of said application will be incorporated in the present application.

Figure 2:
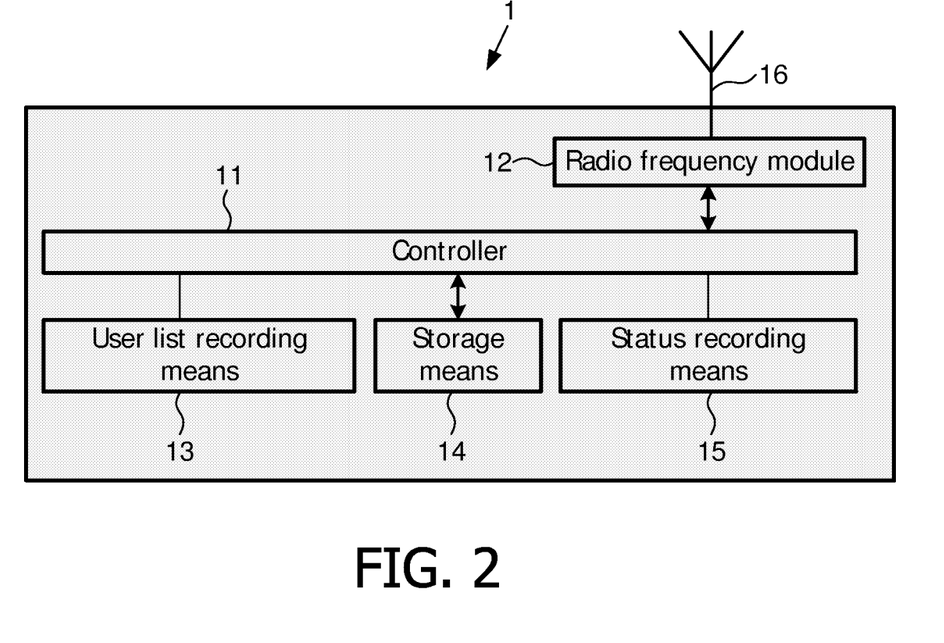
FIG. 2 is a block schematic diagram of the function of the peer-to-peer instant messaging mobile terminal according to one embodiment of the present invention.

FIG. 2 is a block schematic diagram of the function of the peer-to-peer instant messaging mobile terminal according to one embodiment of the present invention. The mobile terminal 1 comprises a controller 11, a radio frequency module 12, a user list recording means 13, a storage means 14, a status recording means 15 and an antenna 16. The controller 11 is used for data processing and storing, and the major functions thereof are base band encoding/decoding, voice encoding and speech encoding, etc. In the present embodiment, said controller 11 is also used for comparing the received list of on-line users with the list of particular users in the user list recording means, and updating the connection status record in said status recording means according to said comparison result. The radio frequency module 12 is used for receiving and transmitting high frequency signal, and comprises a transponder and a receiver (not shown in the figure) connected to the antenna 16, and said radio frequency module 12 together with the antenna 16 forms a receiving means for receiving the list of on-line users that have the capability of peer-to-peer instant messaging transmitted by the radio network. The user list recording means 13 is used for storing a contact list which comprises at least one list of particular users, wherein the so-called particular user is pre-selected by the user of the mobile terminal 1 from the contact list stored in the mobile terminal 1, such as a friend or a business partner. Said list of particular users includes the user's personal information like the name, gender, address and profession, etc., and the mobile terminal identification information of the friend users, such as the international mobile subscriber identity (IMSI), the temporary mobile subscriber identity (TMSI), the local mobile subscriber identity (LMSI), the international mobile equipment identity (IMEI) and the identification code of peer-to-peer communication. The status recording means 15 is used for storing the connection status and the resources status of each user in said list of particular users, for example, the connection status reflects different statuses of each user such as on-line, off-line, busy, dormancy, etc., and the resource status reflects the data transmission rate, available functional module and memory, etc. of each user. According to an embodiment of the present invention, the status recording means 15 could also be used for storing the connection status and the resource status of each user in the contact list. For the sake of simplicity in description, FIG. 2 only shows the functional modules related to the present invention, while the other functional modules are not shown herein.

Figure 3:
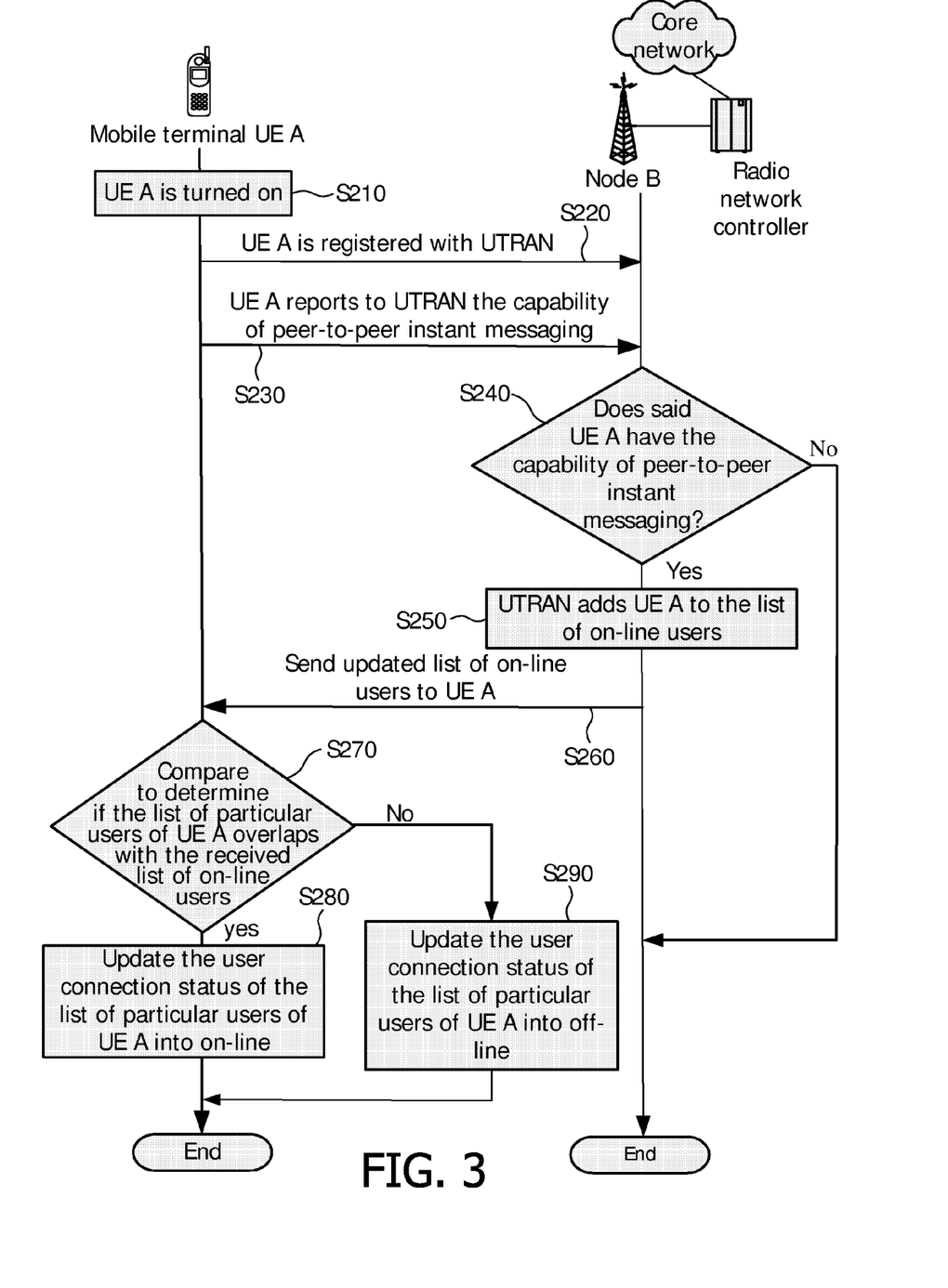
FIG. 3 is a flow chart of the updating of the user status in the method of peer-to-peer instant messaging according to one embodiment of the present invention.

FIG. 3 is a flow chart of the updating of the user status in the method of peer-to-peer instant messaging according to one embodiment of the present invention, and it includes the following steps: UE A is turned on (step S210); UE A is registered with the UTRAN (step S220); UE A reports its capability of peer-to-peer instant messaging to the UTRAN (step S230); the UTRAN receives and determines if said UE A has the capability of peer-to-peer instant messaging (step S240); if it has, the UTRAN will add UE A to the list of on-line users (step S250); UTRAN transmits to UE A and other mobile terminals such as UE B a list of on-line mobile users (including UE A) that could establish peer-to-peer connection with UE A (step S260), and the distance between the user mobile terminal on said list and the mobile terminal A meets the requirement for peer-to-peer communication (or UTRAN could transmits the position information of each mobile terminal to UE A and the UE A then calculates, according to said position information, if said mobile terminal is within the range in which a peer-to-peer connection can be established ), wherein said UTRAN transmits the list of on-line users by means of broadcasting so that other mobile terminals (such as UE B) could also receive the list of on-line users and update the connection status.

After UE A receives said list of on-line users, the controller will compare the list of particular users stored in UE A with the received lists of on-line users one by one to see if the list of particular users of said UE A exists in the received list of on-line users (step S270). Similarly, other mobile terminals (such as UE B) also perform step S270. The contents that are compared could be the peer-to-peer communication identification code of each user, and said identification code may be either the fixed identity recognition information obtained from the network by each user having the capability of peer-to-peer communication or the temporary identity recognition information of the user that is valid during a certain period of time. As for step S270, the controller could also compare the contact list stored in UE A with the received lists of on-line users one by one to see if the contact list of said UE A exists in the received list of on-line users.

The mobile terminal UE A updates the connection status record of each particular user in the status recording means according to said comparison result, that is, updating the user status of the portion of the list of particular users in the user list recording means that is overlapped with said received list of on-line users into on-line (step S280), and updating the user status of the portion of the list of particular users in the user list recording means that is not overlapped with said received list of on-line users into off-line (step S290).

According to another embodiment of the flow of updating the user status of the present invention, the mobile terminal UE A could directly report its capability of peer-to-peer instant messaging to the surrounding mobile terminals (such as UE B); mobile terminal UE B receives said report and then sends an identification information feedback to said mobile terminal UE A; mobile terminal UE A compares the received identification information feedback of other mobile terminals with the list of particular users in the user list recording means thereof; mobile terminal UE A updates the friend connection status records in its status recording means according to the comparison result; finally, mobile terminal UE A could establish a peer-to-peer connection with one of the friend users, such as UE B, according to the friend connection status record and start the instant messaging.

When the user is in the process of peer-to-peer instant messaging, each mobile terminal includes two statuses, i.e., sending information to the opponent mobile terminal and waiting for the response from the opponent mobile terminal. When the mobile terminal is in the status of waiting for the response from the opponent mobile terminal, said mobile terminal only sends necessary signaling to maintain peer-to-peer instant messaging connection, such as the transmit power control (TPC) for managing and adjusting the transmit powers of the base station and the mobile terminal, the dynamic channel allocation (DCA) and the synchronization shift (SS). On the other hand, in order to reduce interference to signals of other mobile terminals, when being in the status of waiting for the response from the opponent mobile terminals, only necessary signaling needs to be sent.

Figure 4:
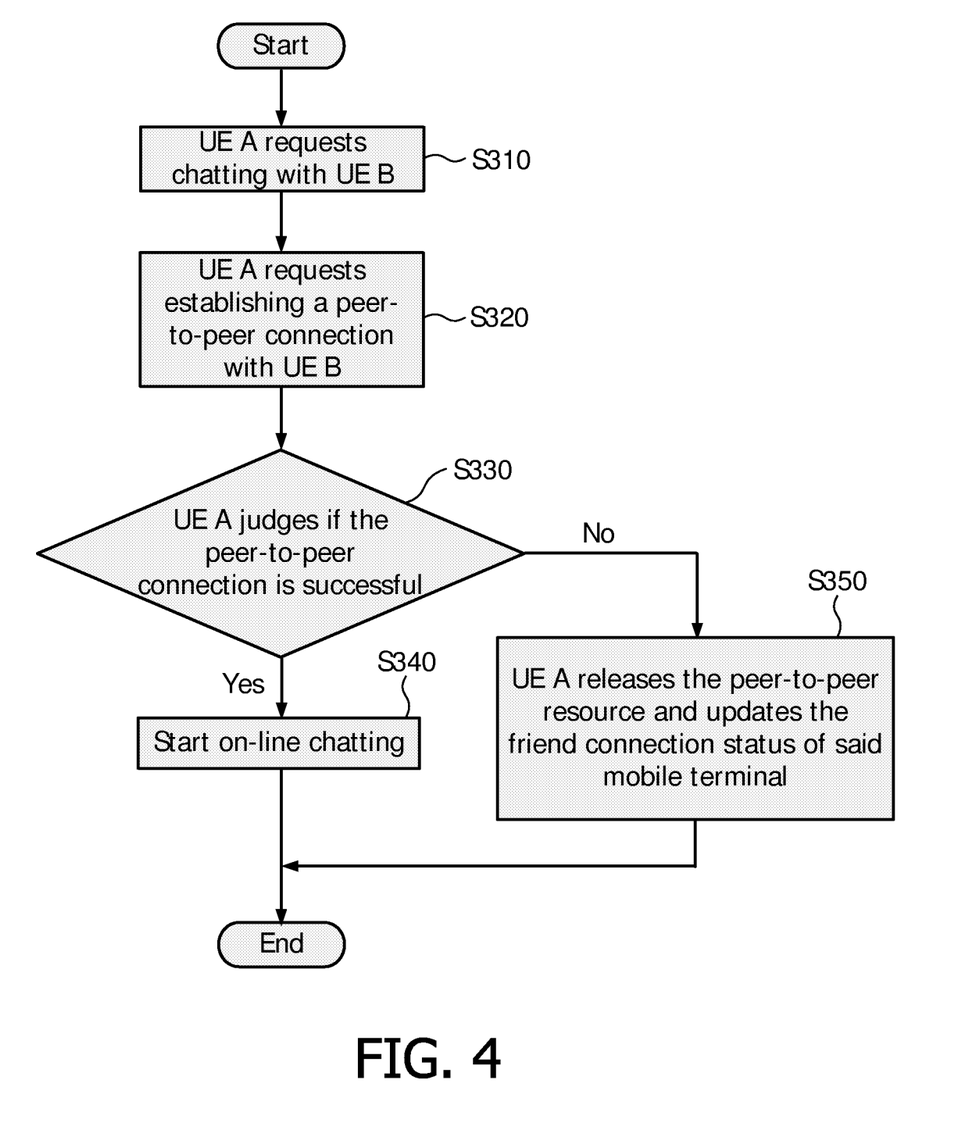
FIG. 4 is a flow chart of the establishing of the peer-to-peer connection in the method of peer-to-peer instant messaging according to one embodiment of the present invention.

FIG. 4 is a flow chart of the establishing of that peer-to-peer connection in the method of peer-to-peer instant messaging according to one embodiment of the present invention, which includes the following steps:

Firstly, UE A sends a request for instant messaging to UE B (step D310), and said step has been described in detail in the patent application No. 03119895.3, so the contents of said invention are inserted herein by reference. The UE A sends a peer-to-peer link request to the UTRAN via the uplink control channel; after receiving said peer-to-peer link request, the UTRAN transmits paging information to the mobile terminal UE B via the paging channel to inform it that the mobile terminal UE A wants to perform peer-to-peer communication with it; the UTRAN allocates channel resources relevant to peer-to-peer communication to mobile terminals UE A and UE B through the downlink control channel; after obtaining said allocated channel resources, mobile terminals UE A and UE B respectively sends to the UTRAN the confirmation information about having obtained the corresponding peer-to-peer resources and said peer-to-peer resources having been activated; meanwhile, the mobile terminals UE A and UE B transmit the UE capability information needed in the peer-to-peer session, such as the sensitivity of the receivers thereof, the receiving power level values of the receivers, etc., to another corresponding mobile terminal in said peer-to-peer communication through the node B in UTRAN; and mobile terminals UE A and UE B enter the direct communication mode.

Then, UE A and UE B establish a peer-to-peer connection (step S320), and this step has also been described in detail in the patent application No. 03119895.3. After entering the direct communication mode, mobile terminals UE A and UE B will enter the status of radio link detection; if the link detection is successful, the mobile terminals UE A and UE B transmit confirmation messages to the node B in UTRAN through the control channel between UE A and node B and the control channel between UE B and node B, respectively, meanwhile, UE A ad UE B start to talk through the channel P2P-DCH.

UE A determines if the peer-to-peer connection is successful (step S330). If it is successful, UE A starts peer-to-peer chatting with UE B (step S340), after the connection is detected to be successful and the terminals UE A and UE B enter the peer-to-peer communication, UE A and UE B still need to continuously monitor the performance of the peer-to-peer communication link during the process of peer-to-peer communication so as to maintain the peer-to-peer radio link; if the peer-to-peer connection is unsuccessful, UE A releases the corresponding peer-to-peer resources and updates the status of UE B in its status recording means 15 (step S350).

Figures 5, 6:
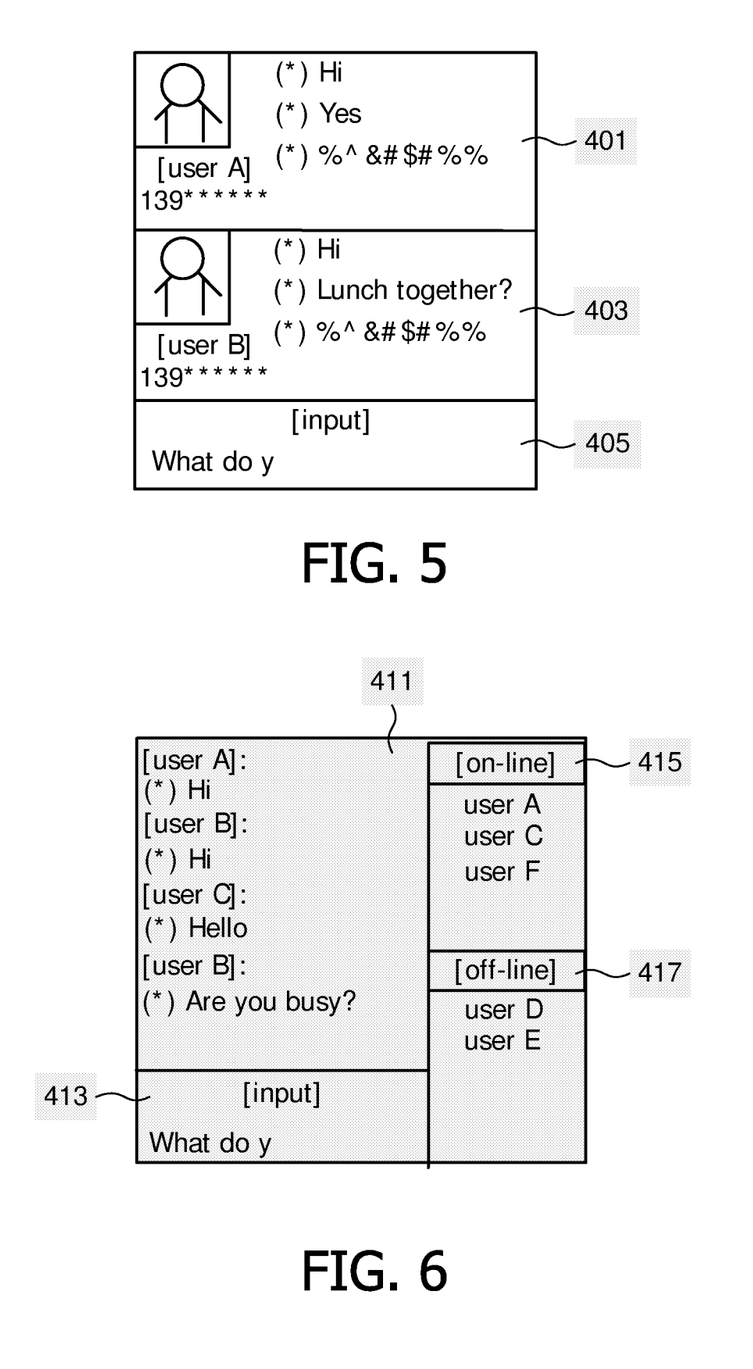
FIG. 5 is a schematic diagram of the user interface of the peer-to-peer instant messaging mobile terminal according to one embodiment of the present invention.
FIG. 6 is a schematic diagram of the user interface of the peer-to-peer instant messaging mobile terminal according to another embodiment of the present invention.

FIG. 5 is a schematic diagram of the user interface of the peer-to-peer instant messaging mobile terminal according to one embodiment of the present invention. For example, said user interface is displayed on the display means of the mobile terminal UE A, said user interface includes an information input window 405, a first information display window 401 and a second information display window 403. The information input window 405 is adapted for the user that uses UE A to input information like the relevant words, graphics, etc. The first information display window 401 is used for displaying the input information of said UE A as well as the personal identification information of the user that uses UE A, such as the head portrait, name, telephone number, etc. Likewise, the second information display window 403 is used for displaying the information sent by other mobile terminals, such as UE B, that are performing instant messaging with UE A, as well as the personal identification information of the user that uses UE B, such as the head portrait, name, telephone number, etc.

FIG. 6 is a schematic diagram of the user interface of the peer-to-peer instant messaging mobile terminal according to another embodiment of the present invention. For example, said user interface is displayed on the display means of the mobile terminal UE A, said user interface includes an information display window 411, an information input window 413, an on-line user list display window 415 and an off-line user list display window 417. Wherein the information display window 411 is used for displaying the chatting record of all the users that participate in the instant messaging; the information input window 413 is adapted for the user that uses UE A to input information like the relevant words, graphics, etc., which are displayed in the information display window 411 after being transmitted. The on-line user list display window 415 is used for displaying the list of on-line users that could establish peer-to-peer connection with UE A in the list of particular users of UE A, so that the UE A could establish a peer-to-peer connection with one of the mobile terminals, such as UE B, according to said list of on-line users; and the off-line user list display window 417 is used for displaying the list of all off-line users in the list of particular users of the UE A.

The method for peer-to-peer instant messaging and the mobile terminal provided by the present invention could also support the one point-to-multipoint and multipoint-to-multipoint instant messaging, that is, a mobile terminal could perform peer-to-peer instant messaging with many mobile terminals simultaneously.

Those skilled in the art shall understand that various improvements could be made to the method for peer-to-peer instant messaging and the mobile terminal thereof as disclosed in the present invention without departing from the contents of the present invention, so the protection scope of the present invention should be defined by the appended claims.

The invention claimed is:

1. A method of peer-to-peer instant messaging for a mobile terminal, said mobile terminal comprising a pre-stored contact list which includes at least one list of particular users, said method comprising:
    receiving, at a mobile terminal, a list of on-line users that have capability of peer-to-peer instant messaging which is sent by a radio network;
    comparing, at the mobile terminal, said list of particular users with said received list of on-line users; and
    updating, according to said comparison result, connection status record of each user in said list of particular users, to make the mobile terminal to establish peer-to-peer instant messaging with at least one user mobile terminal in said list of particular users according to said updated connection status record, wherein the list of particular users is a subset of the contact list.

2. The method of peer-to-peer instant messaging as stated in claim 1, wherein the list of on-line users is transmitted through cell broadcasting by the radio network.

3. The method of peer-to-peer instant messaging as stated in claim 1, wherein updating further comprises updating the user connection status records of the portion of said list of particular users that is overlapped with said list of on-line users into on-line.

4. The method of peer-to-peer instant messaging as stated in claim 1, wherein updating further comprises updating the user connection status record of the portion of said contact list that is not overlapped with said list of on-line users into off-line.

5. The method of peer-to-peer instant messaging as stated in claim 1, wherein said list of particular users is said contact list.

6. A method of peer-to-peer instant messaging for a mobile terminal, said mobile terminal comprising a pre-stored contact list which includes at least one list of particular users, said method comprising:
    reporting to other mobile terminals capability of peer-to-peer instant messaging;
    receiving identification information feedback sent by said other mobile terminals respectively;
    comparing said list of particular users with said received identification information feedback; and
    updating, according to said comparison result, the connection status record of each user in said list of particular users, to make said mobile terminal to establish peer-to-peer instant messaging with at least one user mobile terminal in said list of particular users according to said updated connection status record, wherein the list of particular users is a subset of the contact list.

7. A mobile terminal for peer-to-peer instant messaging, comprising:
    a receiver configured to receive the list of on-line users that have capability of peer-to-peer instant messaging transmitted by the radio network;
    a user list recorder configured to store a contact list which comprises at least one list of particular users;
    a status recorder configured to record the connection status of each user in said list of particular users; and
    a controller for comparing said received list of on-line users with said list of particular users, wherein the list of particular users is a subset of the contact list.

8. A mobile terminal as stated in claim 7, further comprising a display configured to display a user interface, said user interface comprising:
    an information input window for inputting information;
    an information display window for displaying said input information; and
    an on-line user list display window for displaying the list of on-line users that could establish peer-to-peer connection with said mobile terminal in said list of particular users.

9. A mobile terminal as stated in claim 8, wherein said user interface further comprises an off-line user list display window for displaying the list of off-line users in the contact list.

10. A mobile terminal as stated in claim 7, further comprising a display configured to display a user interface, said user interface comprising:
    an information input window for inputting information;
    a first information display window for displaying said input information; and
    a second information display window for displaying information sent by other mobile terminals.

11. A mobile terminal as stated in claim 10, wherein the first information display window and the second information display window are further for respectively displaying identification information of said mobile terminal and said other mobile terminals.

12. A mobile terminal as stated in claim 7, wherein said contact list includes the personal information of each user and the identification information of each user mobile terminal.

13. A mobile terminal as stated in claim 7, wherein the controller is for updating the connection status of each user in said contact list according to said comparison result.

14. The method of peer-to-peer instant messaging as stated in claim 6, wherein the list of on-line users is transmitted through cell broadcasting.

15. The method of peer-to-peer instant messaging as stated in claim 6, wherein updating further comprises updating the user connection status records of the portion of said list of particular users that is overlapped with said list of on-line users into on-line.

16. The method of peer-to-peer instant messaging as stated in claim 6, wherein updating further comprises updating the user connection status record of the portion of said contact list that is not overlapped with said list of on-line users into off-line.

17. The method of peer-to-peer instant messaging as stated in claim 6, wherein said list of particular users is said contact list.

18. The mobile terminal as stated in claim 7, wherein the list of on-line users is transmitted through cell broadcasting.

19. The mobile terminal as stated in claim 13, wherein updating further comprises updating the user connection status records of the portion of said list of particular users that is overlapped with said list of on-line users into on-line.

20. The mobile terminal as stated in claim 13, wherein updating further comprises updating the user connection status record of the portion of said contact list that is not overlapped with said list of on-line users into off-line.

\* \* \* \* \*